UNITED STATES PATENT OFFICE.

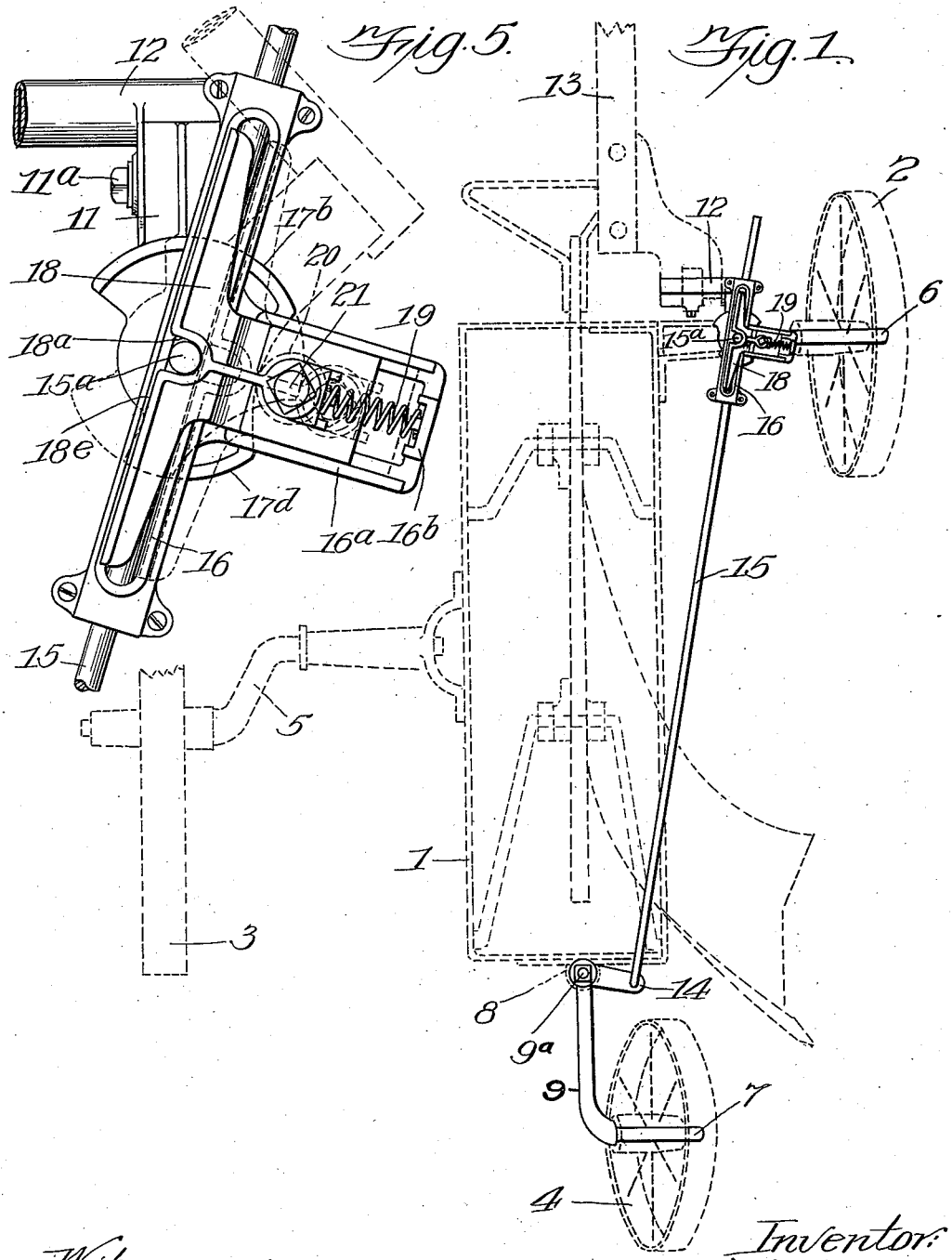

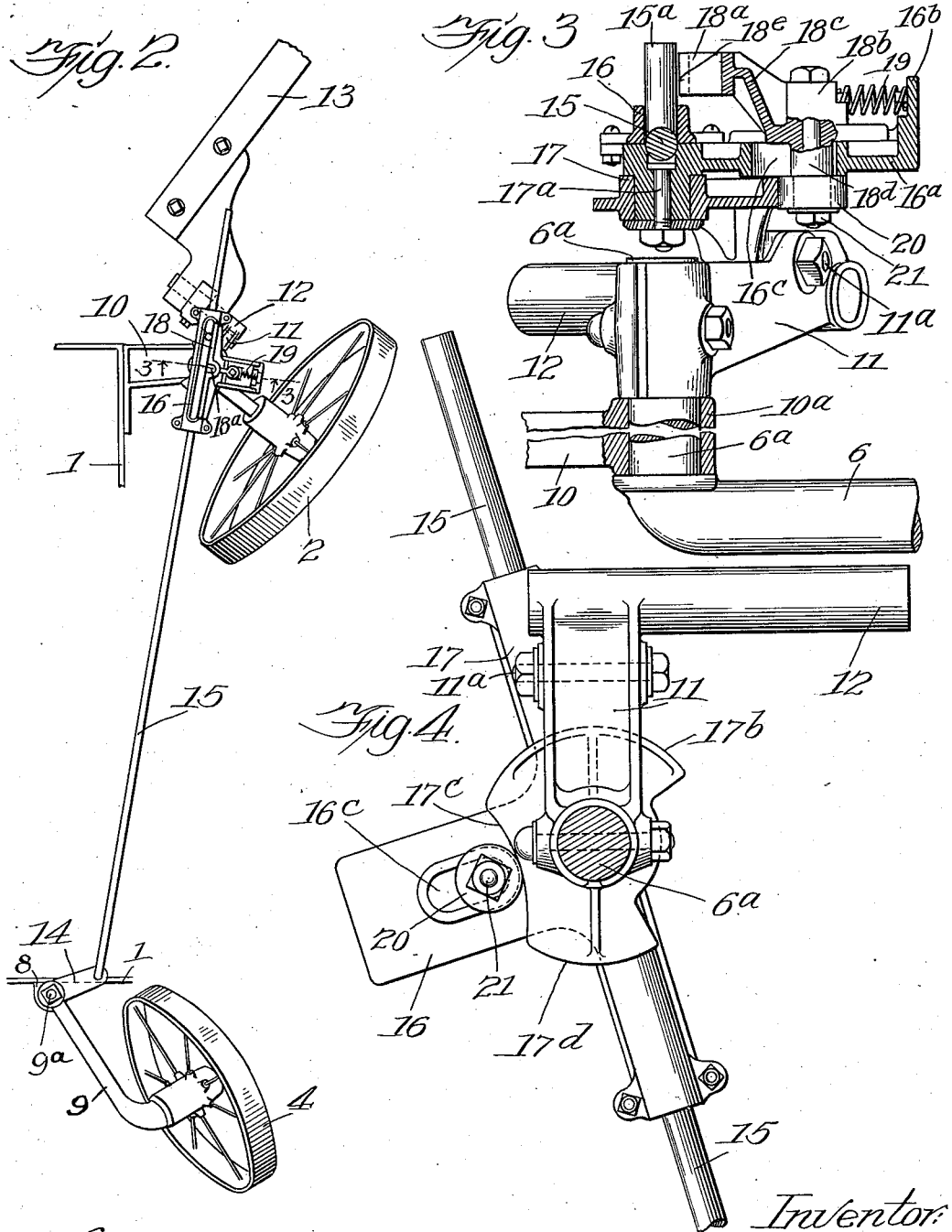

WINFIELD S. NICHOLS, OF PLANO, ILLINOIS, ASSIGNOR TO INDEPENDENT HARVESTER COMPANY, OF PLANO, ILLINOIS, A CORPORATION OF MAINE.

WHEEL-PLOW.

1,012,697.  Specification of Letters Patent. Patented Dec. 26, 1911.

Application filed May 4, 1911. Serial No. 624,959.

*To all whom it may concern:*

Be it known that I, WINFIELD S. NICHOLS, a citizen of the United States, residing at Plano, in the county of Kendall and State of Illinois, have invented new and useful Improvements in Wheel-Plows, of which the following is a specification, reference being had to the accompanying drawings, forming a part thereof.

This invention relates to means for controlling the rear caster wheels of wheel plows.

It consists of the features and elements described and shown in the drawings as indicated in the claims.

In the drawings:—Figure 1, is a plan view of a wheel plow showing the general configuration of the plow in dotted lines and in full lines the features embodying this invention. Fig. 2, is a detail plan view of the caster controlling device, showing it in unlocked position. Fig. 3, is a sectional elevation of the same taken as indicated at line 3—3 on Fig. 2. Fig. 4, is a bottom plan view of the device, in locked position. Fig. 5, is an enlarged plan view of the locking mechanism, showing the unlocked position in dotted lines.

As shown in Fig. 1, the plow frame, 1, is supported and carried by three wheels, namely, the front steering wheel, 2, a side wheel, 3, and a rear caster wheel, 4. The side wheel, 3, is journaled on a sidewardly extended axle, 5, whose angle with the frame, 1, is fixed; while the front and rear wheels, 2 and 4, are carried upon short axles, 6 and 7, respectively, which are pivotally connected with the frame, in order to be adapted for steering the plow around curves as well as in a straight path.

The caster wheel axle, 7, is a short arm, jutting from the caster wheel bracket, 9, which comprises a vertical stem portion, 9ª, journaled in a sleeve bracket, 8, mounted upon the rear end of the frame, 1. The forward axle, 6, is bent upwardly at its inner end and this vertical post, 6ª, passes through a sleeve, 10ª, of a sidewardly extending bracket, 10, of the frame, 1. Above this sleeve there is secured to the post, 6ª, an angle bracket, 11, carrying the rock shaft, 12, to which the tongue, 13, of the plow is connected and by which it is permitted to rock in a vertical plane, in the customary manner.

With no additions to the parts described it will be seen that the caster wheel, 4, will act merely as a trailer and will swing about its pivot, 9ª, whenever the plow is deflected from a straight-ahead course, by turning the steering wheel, 2, out of its straight-ahead position. In making turns with the plow this is the desired operation, that is, that the trailing caster wheel shall swing about its pivot to accommodate itself to the curve of the path determined by the steering wheel, 2.

The caster wheel, 4, is liable to be wabbled more or less, from side to side, by reason of irregularities, stones or soft places in the furrow which it is following, whereas it is desirable that it should be held to unvarying position following the correct line of the furrow. To hold it thus in unvarying position free from wabbling due to the causes indicated, there is provided means hereinafter described for locking the caster wheel bracket, 9, rigidly with the frame, except when it should be free to turn when making turns with the plow. The most convenient means of thus locking the caster wheel bracket consists in providing it with a sidewardly-extending lever arm, 14, connected by a reach, 15, which extends to the steering wheel bracket where it is locked, as hereinafter described.

In the ordinary course of plowing there is always a certain amount of side-to-side play of the tongue, 13, caused by the walking of the draft horses, particularly if the ground traversed is rough or uneven, and it is desirable that this limited play of the tongue, which necessarily causes a certain amount of turning of the steering wheel, 2, about the axis of its king post, 6ª, be not transmitted to the caster wheel, 4; for if this caster wheel were free to follow all the slight deviations of the steering wheel from a straight course, it would only tend to magnify the crookedness of the path and cause the plow to make a crooked furrow instead of a straight one.

In order to hold the steering wheel locked as described, so that it will not wabble by reason of the irregularities in its own furrow and also to prevent its being wabbled by the wabbling of the steering wheel, the connection of the reach, 15, to the steering wheel bracket is made in the following manner: The forward end of the reach rod, 15, is slidably secured in a guide, 16, carried by a bracket, 17, which is mounted upon the angle bracket, 11. The connection of the guide, 16, with the bracket, 17, is made by means of a pivot bolt, 17ª, located directly over the end of the post 6ª, and co-axial therewith, so as to permit the turning of the post within its sleeve, 10ª, without affecting the position of the reach rod, 15. The rod, 15, has an upstanding lug, 15ª, which when the caster wheel, 4, stands in a normal straight-ahead position, is engaged by the notch, 18ª, of the lock member, 18. This lock is slidably carried in a bracket portion, 16ª, extending transversely of the guide, 16, and secured thereto. A spring, 19, re-acting between an upstanding lug, 16ᵇ, at the outer end of the bracket, 16ª, and a boss, 18ᵇ, on the guide arm, 18ᶜ, of the lock member, 18, normally holds the lock in position with its notch, 18ª, engaging lug, 15ª, of the reach rod. In line with the boss, 18ᵇ, and below it, the arm has a downwardly extending hub, 18ᵈ, which protrudes through a slot, 16ᶜ, in the slide bracket and journals on its lower end a roller, 20, held in position by a bolt, 21, passing through the boss and hub. The bracket, 17, has a peripheral flange, formed to act as a cam against the roller, 20, when the bracket, 17, is turned with respect to the guide, 16, when the steering wheel, 2, turns about the axis of its king post, 6ª. This cam face may be considered in three portions, indicated at 17ᵇ, 17ᶜ and 17ᵈ, respectively. The middle portion, 17ᶜ, is so formed as to permit a limited amount of side play of the steering wheel, 2, without causing sufficient outward movement of the roller, 20, to release the lock member, 18, which it governs. The portion, 17ᵇ, is substantially an arc of a circle described about the center of the pivot bolt, 17ª, and with such radius that as the roller, 20, rides onto this portion of the cam, the lock member, 18, is thrust transversely out of engagement with the lug, 15ª. It is expected that the amount of angular movement of the steering wheel, which is necessary to accomplish this unlocking of the reach rod, 15, will only take place in the case of an intentional turn, at which time it is desirable that the caster wheel, 4, be unlocked and permitted to follow the curved path for facilitating the turn. The portion of the cam indicated at, 17ᵈ, is similar to that at, 17ᵇ, and will come into operation in the case of a turn in the opposite direction. As the turn nears completion, the steering wheel will assume its straight-ahead position in which the middle portion, 17ᶜ, of the cam face is opposite the roller, 20, and at the same time the trailing caster wheel, 4, in assuming its straight-ahead position brings the lug, 15ª, of the reach rod opposite the notch, 18ª, of the lock which is then brought into engagement with it by pressure of the spring, 19, which is no longer resisted by the action of the cam. In case the caster wheel lags a little behind the steering wheel, in assuming a straight-ahead position, it will be seen that the resistance of the cam to the action of the spring, 19, may be removed before the lug, 15ª, has come into registration with the notch, 18ª, in which case the flat face, 18ᵉ, will be pressed against the lug by the spring, 19. This face, however, is polished smooth, as is also the lug, and with the leverage furnished by the relative lengths of the bracket, 8, and its rocker arm, 14, the caster wheel in assuming its straight-ahead position, will readily bring the lug, 15ª, into registration with the notch, 18ª, and the lock will then snap into locking position.

It may be noted that the cam bracket, 17, is connected to the angle bracket, 11, by a horizontal pivot bolt, 11ª. This is to permit a certain amount of vertical tilting of the bracket, 17, and the guide, 16, carried by it to accommodate the guide to the change of position of the rod, 15, occasioned by raising or lowering the plow frame in adjusting for the desired depth of furrow.

I claim :—

1. In a wheel plow, in combination with the frame, the tongue pivotally connected thereto, and a rear caster wheel, a reach rod connected to the caster wheel bracket, a locking device carried by the frame, positioned for securing the rod against longitudinal movement, a cam mounted for rotation with the tongue about its pivot and formed for effecting disengagement of the locking device when the tongue is so rotated beyond certain angular limits in either direction, and operative connections between said cam and the locking device.

2. In a wheel plow, in combination with the frame, the tongue pivotally connected thereto, and a rear caster wheel, a reach rod connected at one end to the caster wheel bracket, a lock member carried by the frame, said lock member and the reach rod being formed with mutually engaging features, and coöperating features on the lock member and the tongue bracket respectively, positioned and adapted for encounter when the tongue is rotated about its pivot.

3. In a wheel plow, in combination with the frame, the tongue pivotally connected thereto, and a rear caster wheel, a reach rod connected at one end to the caster wheel bracket, the other end of the reach rod intersecting the axis of the tongue pivot and having a transversely extending lug, a guide for the rod pivoted on the tongue bracket coaxially with the tongue pivot, a spring-pressed lock mounted for movement transverse of the rod and having a notch adapted to engage the lug thereof, and a cam mounted for rotation with the tongue about its pivot and formed for disengaging the lock from the lug during such rotation.

4. In a wheel plow, in combination with the frame, the tongue pivotally connected thereto, and a rear caster wheel, a reach rod connected to the caster wheel bracket, a locking device carried by the frame, positioned for securing the rod against longitudinal movement, a cam mounted for rotation with the tongue about its pivot, the locking device having a projection and the outline of the cam being formed with a recess positioned to receive said projection when the tongue and caster wheel are in normal straight ahead positions, the outlines of the cam at either side of said recess being of greater radius than the bottom of the recess for effecting disengagement of the locking device when the tongue is rotated.

5. In a wheel plow, in combination with the frame, the tongue pivotally connected thereto, and a rear caster wheel, a reach rod connected at one end to the caster wheel bracket, a slotted guide mounted on the frame, the reach rod having a transversely extending lug engaging the slot of said guide, a straight edged shoe mounted for movement transverse of the guide slot with its straight edge parallel to said slot, a spring adapted to hold the shoe in contact with the lug of the reach rod, the straight edge of the shoe being notched to receive said lug for securing the rod against longitudinal movement, and means operatively connected with the tongue and adapted to effect disengagement of the notch and the lug when said tongue is rotated.

In testimony whereof I have hereunto set my hand at Chicago, Illinois, this 27th day of April, 1911.

WINFIELD S. NICHOLS.

Witnesses:
LUCY I. STONE,
M. GERTRUDE ADY.

---

Copies of this patent may be obtained for five cents each, by addressing the "Commissioner of Patents, Washington, D. C."